(12) United States Patent
Boucheron et al.

(10) Patent No.: US 6,361,196 B1
(45) Date of Patent: Mar. 26, 2002

(54) ELECTRICAL MODULE FOR MULTIPLEXED CONTROL OF A SET OF LIGHTING OR SIGNALLING LAMPS FOR A MOTOR VEHICLE

(75) Inventors: Jean-Louis Boucheron, Savigny le Temple; Daniel Segaud, Paris, both of (FR)

(73) Assignee: Valeo Vision, Bobigny (FR)

( * ) Notice: Subject to any disclaimer, the term of this patent is extended or adjusted under 35 U.S.C. 154(b) by 855 days.

(21) Appl. No.: 08/911,064

(22) Filed: Aug. 14, 1997

Related U.S. Application Data

(63) Continuation of application No. 08/241,487, filed on May 12, 1994, now abandoned.

(30) Foreign Application Priority Data

May 14, 1993 (FR) ............................................. 93 05845

(51) Int. Cl.[7] ................................................. B60Q 1/00
(52) U.S. Cl. ........................ 362/546; 362/459; 340/468
(58) Field of Search ................................ 307/9.1, 10.1, 307/10.8; 340/468, 815.52, 815.49; 315/77; 353/13, 14; 439/56; 362/61, 249, 459, 487, 508, 525, 544, 546

(56) References Cited

U.S. PATENT DOCUMENTS

| 4,779,167 A | * 10/1988 | Nelson | ...................... 362/61 |
| 4,858,082 A | * 8/1989 | Hayward | ...................... 362/61 |
| 5,198,696 A | * 3/1993 | Dennis | ...................... 307/10.1 |
| 5,350,305 A | * 9/1994 | Pidancet | ...................... 439/56 |

FOREIGN PATENT DOCUMENTS

| EP | 0217762 | 4/1987 |
| EP | 0326668 | 8/1989 |
| EP | 0392824 | 10/1990 |
| EP | 0430792 | 6/1991 |
| FR | 2654996 | 5/1991 |

* cited by examiner

*Primary Examiner*—Kent Chang
(74) *Attorney, Agent, or Firm*—McCormick, Paulding & Huber LLP (57) ABSTRACT

An electrical module, in particular for a block of signalling lights for a motor vehicle, comprises, in combination:

a lamp-carrier implementing a plurality of recesses used as sockets for lamps;

an electronic circuit for processing a control and switching signal to selectively switch on and switch off lamps received in the sockets as a function of instructions contained in the control signal;

a printed circuit carrying said electronic circuit;

electrical power link means between the electronic circuit and the sockets; and means for associating the lamp-carrier with the printed circuit and for establishing an electrical connection between said printed circuit and the electrical power link means.

24 Claims, 5 Drawing Sheets

FIG_3c

FIG_3a

FIG_3b

FIG_4

FIG_5b

FIG_5a

FIG_5c

FIG_5d

ELECTRICAL MODULE FOR MULTIPLEXED CONTROL OF A SET OF LIGHTING OR SIGNALLING LAMPS FOR A MOTOR VEHICLE

This is a continuation of application Ser. No. 08/241,487 filed on May 12, 1994, now abandoned.

The present invention relates in general to so-called "multiplexed" control of the switching on and off of lighting or signalling lamps for motor vehicles.

BACKGROUND OF THE INVENTION

The principles of such multiplexed control whereby a single control signal conveys on/off instructions for a plurality of independent light functions, and a bus conveying said control signal together with a single power supply line travels round the various lighting and signalling devices, are known, in particular from FR-A-2 154 209, DE-A-2 809 763, and EP-A-0 217 762. However, those documents describe only the electrical and electronic principles of such control.

Attempts have recently been made to improve the integration of electronic circuits associated with that type of control in signal light blocks. Document FR-A-2 654 996 describes one such attempt.

OBJECTS AND SUMMARY OF THE INVENTION

The present invention seeks to propose other ways of achieving such integration that are practical and cheap to implement.

To this end, the present invention provides an electrical module, in particular for a block of signalling lights for a motor vehicle, the module comprising, in combination:

a lamp-carrier implementing a plurality of recesses used as sockets for lamps;

an electronic circuit for processing a control and switching signal to selectively switch on and switch off lamps received in the sockets as a function of instructions contained in the control signal;

a printed circuit carrying said electronic circuit;

electrical power link means between the electronic circuit and the sockets; and means for associating the lamp-carrier with the printed circuit and for establishing an electrical connection between said printed circuit and the electrical power link means.

Advantageous, but optional, aspects of the module of the present invention are the following:

the lamp-carrier is in the form of a plate including conductive tracks on one side constituting the electrical power link means, and a housing on the opposite side in which mounting means are provided for the printed circuit carrying said electronic circuit, and said printed circuit carries contacts that extend parallel to an insertion and extraction direction for said printed circuit and suitable for passing through said lamp-carrier to be electrically connected to said tracks;

said insertion and extraction direction for the printed circuit is essentially perpendicular to a general plane of said lamp-carrier;

the module further comprises a cover for closing said housing, an opening being formed in the cover to give access to a connector for electrical control and power supply purposes mounted on said printed circuit;

the lamp-carrier is in the form of a plate including on one side conductive tracks constituting the electrical power link means and on the opposite side means forming abutments for the printed circuit, the printed circuit extends essentially parallel to a general plane of said lamp-carrier, electrical connection means are provided between said conductive tracks and said electronic circuit, which means extend essentially transversely to the printed circuit and to lamp-carrier, passing through the lamp-carrier for electrical connection with said tracks, and a housing is also provided mounted on the lamp-carrier and defining counter-abutments for the printed circuit;

connection means adaptable to constitute a connector for connecting a conventional bundle of individual power supply conductors for said lamps in the absence of the electronic circuit;

a control and power supply connector is also provided including contacts mounted on the printed circuit and passing through the housing, the housing including fittings that define a cavity for receiving said contacts;

the lamp-carrier possesses means forming a bearing surface for said printed circuit in register with said control and power supply connector;

the printed circuit also constitutes a lamp support plate, the electrical power link means are carried by said printed circuit, and add-on sockets are also provided on the same side as the components of said electronic circuit and are soldered to the printed circuit;

a housing is also provided that includes fittings enabling it to be mounted on the module by co-operating with associated fittings formed on the add-on sockets;

said fittings are snap-fastening fittings;

a control and power supply connector is also provided including contacts mounted in the thickness of the housing and connected to the printed circuit, said housing including fittings that define a cavity for receiving said contacts;

said fittings bear against the printed circuit in the vicinity of the contacts;

the printed circuit is a double-sided printed circuit, the components of the electronic circuit are surface-mount components, and the sockets and the contacts of the connector are soldered to the printed circuit on its side opposite from the components;

the printed circuit is a single-sided printed circuit, the components of the electronic circuit are through mount components, and the portions of the components, of the sockets, and of the contacts of the connector that are to be soldered all project from the same side of the printed circuit, which side is opposite from the components, thereby making it possible to use a single wave soldering operation;

each socket includes a body of insulating material and at least two conductor members carried by the body, each conductor member projecting at one end into a cavity defined by said body for receiving the base of a lamp, and at its opposite end into the vicinity of a surface of the body that bears against the printed circuit and that is in alignment with said surface, thereby enabling electrical connections to be made with the socket by reflow soldering while simultaneously making connections with the components of the electronic circuit by reflow soldering;

said bearing surface of the socket body includes a groove for receiving a sealing ring;

said other ends of the conductor members project outwards relative to a base region of the body that defines said bearing surface;

each socket body includes fittings suitable for cooperating with associated fittings provided on the printed circuit for holding said socket body prior to reflow soldering;

a housing is also provided that is glued to the periphery of the printed circuit;

a control and power supply connector is also provided including a base holding captive a plurality of contacts of the connector, said base having a bearing surface pressing against the printed circuit and said contacts being disposed flush with said bearing surface to enable an electrical connection to be made with said base by reflow soldering simultaneously with the electrical connections with the components of the electronic circuit themselves being made by reflow soldering, said base defining a cavity in which the contacts of the connector are received;

the base of the connector includes fittings suitable for co-operating with associated fittings provided on the printed circuit for holding said base prior to reflow soldering;

said housing includes an opening in register with said cavity defined by the base;

the housing is soldered to said base in the vicinity of said opening; and the housing has, in register with each add-on socket, a fitting bearing against a face of said socket that is opposite from the printed circuit.

BRIEF DESCRIPTION OF THE DRAWINGS

Other aspects, objects, and advantages of the present invention appear more clearly on reading the following detailed description of a preferred embodiment of the invention given by way of example and described with reference to the accompanying drawings, in which:

FIG. 3b is a rear elevation view of a portion of the lamp-carrier module of FIG. 3a;

FIG. 3c is a rear elevation view on a smaller scale showing a detail of the lamp-carrier module of FIGS. 3a and 3b;

FIG. 5c is a detailed view on a larger scale of FIG. 5a; and

MORE DETAILED DESCRIPTION

As a preliminary point, it should be observed that from one figure to another, elements or parts that are identical or similar are designed wherever possible by the same reference symbols and are not described again each time.

It should also be observed that in general the terms "front" and "rear", and the like are used relative to the general direction in which light is emitted.

Figure 1A:
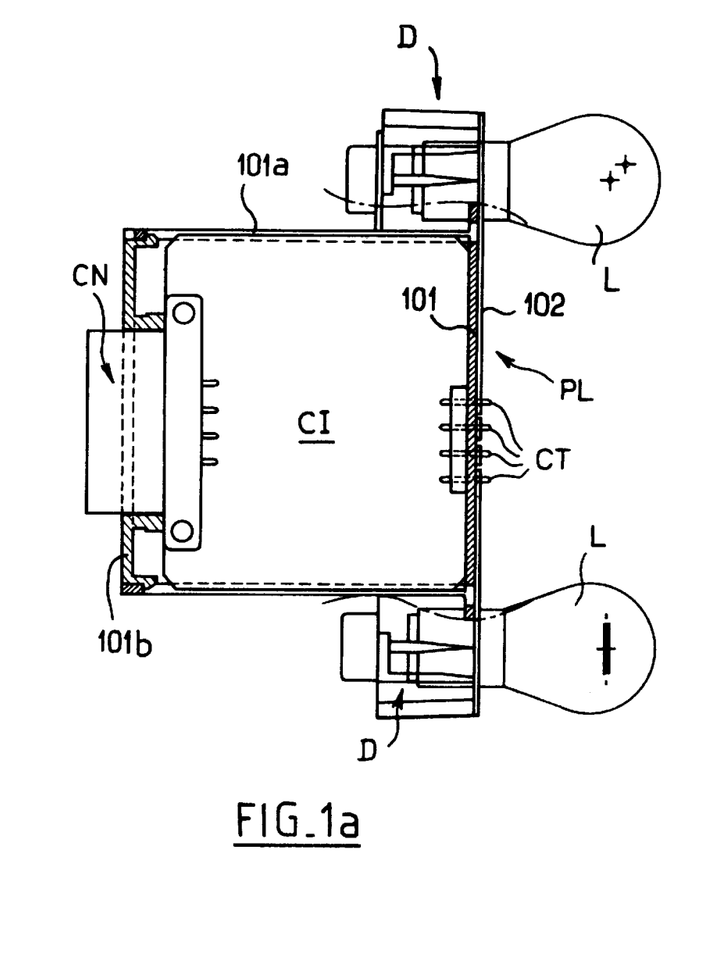
FIG. 1a is a side elevation view partially in section through a lamp-carrier module for signalling lights constituting a first embodiment of the present invention.
Figure 1B:
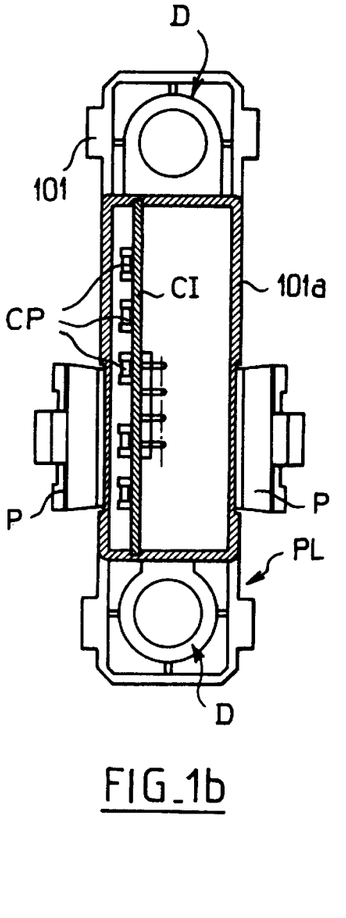
FIG. 1b is a rear elevation view in partial section of the FIG. 1a lamp-carrier module.
Figure 1C:
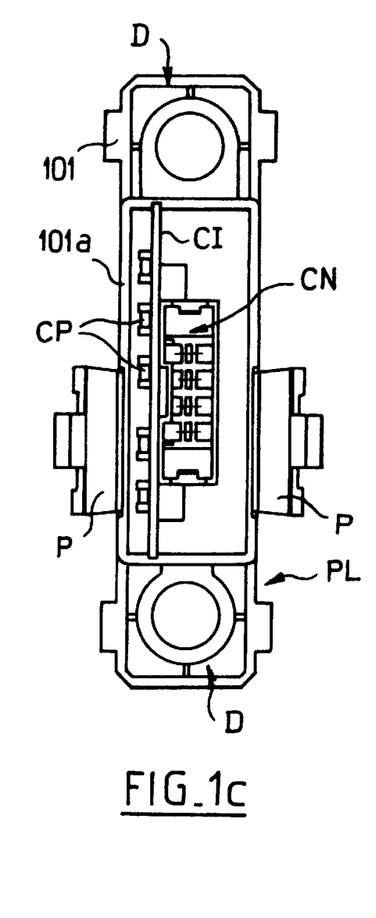
FIG. 1c is a rear elevation view of the 1amp-carrier module of FIGS. 1a and 1b.

With reference initially to FIGS. 1a, 1b, and 1c, there can be seen a lamp-carrier module of a signalling light block for a motor vehicle, the module comprising a lamp-carrier, lamp-carriers mounted on the carrier, an electronic circuit for demultiplexing control signals for turning the lamp-carriers on and off, an electronic power circuit for switching power on and off to the lamp-carriers under the control of the demultiplexing circuit, a power distribution circuit having conductive tracks between the power circuit and the lamp-carriers, and a connector for feeding the lamp-carrier module with the control signals, with the lamp-carrier power supply voltage (typically +12 V), and with ground potential.

For greater detail concerning multiplexed control of lighting and signalling lamp-carriers for a motor vehicle, reference may be made, for example, to the documents mentioned in the introduction.

In conventional manner, the lamp-carrier is mounted on a base carrying one or more light flux collecting mirrors and one or more closure glasses.

The lamp-carrier PL is implemented in conventional manner, i.e. it comprises a support of plastics material 101 receiving the power distribution circuit 102 that is made up of a precut metal circuit establishing electrical connection between power outlets for the lamp-carriers, situated in the central region of the lamp-carrier, and sockets D for receiving the lamp-carriers L and defined by the lamp-carrier.

Extending from the side opposite to the lamp-carriers L, the support 101 of the lamp-carrier PL includes a housing 101a, e.g. in the form of a rectangular parallelepiped, and is advantageously integrally molded with the support 101.

A printed circuit CI is disposed vertically and parallel to the axes of the lamp-carriers L inside the housing, the printed circuit carrying the circuit for demultiplexing a multiplexed control signal which is applied to a connector CN that is secured to the printed circuit by means of rivets, for example, and that extends rearwards (to the left in FIG. 1a), and also the power semiconductor circuit that is controlled by the demultiplexing circuit to selectively apply or not apply voltage to the terminals of respective lamp-carriers. The components of these circuits are represented diagrammatically and they are given reference CP.

The printed circuit CI is held in place, for example by means of support grooves provided in the top and bottom walls of the housing 101a, as can be seen in particular in FIGS. 1b and 1c.

Along its edge directed towards the lamp-carrier PL, the printed circuit also carries a set of contacts CT extending in the insertion and extraction direction of the printed circuit and capable of passing through the support 101 of the lamp-carrier PL in the central region thereof and projecting from the side of the circuit having the cutout tracks 102 by passing through holes provided at the ends of the tracks, each of which leads towards one of the lamp-carrier sockets D. The contacts CT are soldered to the tracks, e.g. by means of a robot.

Finally, the lamp-carrier module of FIGS. 1*a* to 1*c* includes a rear cover 101*b* for the housing 101*a*, which cover has an opening formed therein for the connector CN. In the present case, the cover is snap-fastened onto the housing and serves to provide support for the printed circuit CI in the axial direction.

Figures 2A, 2C:
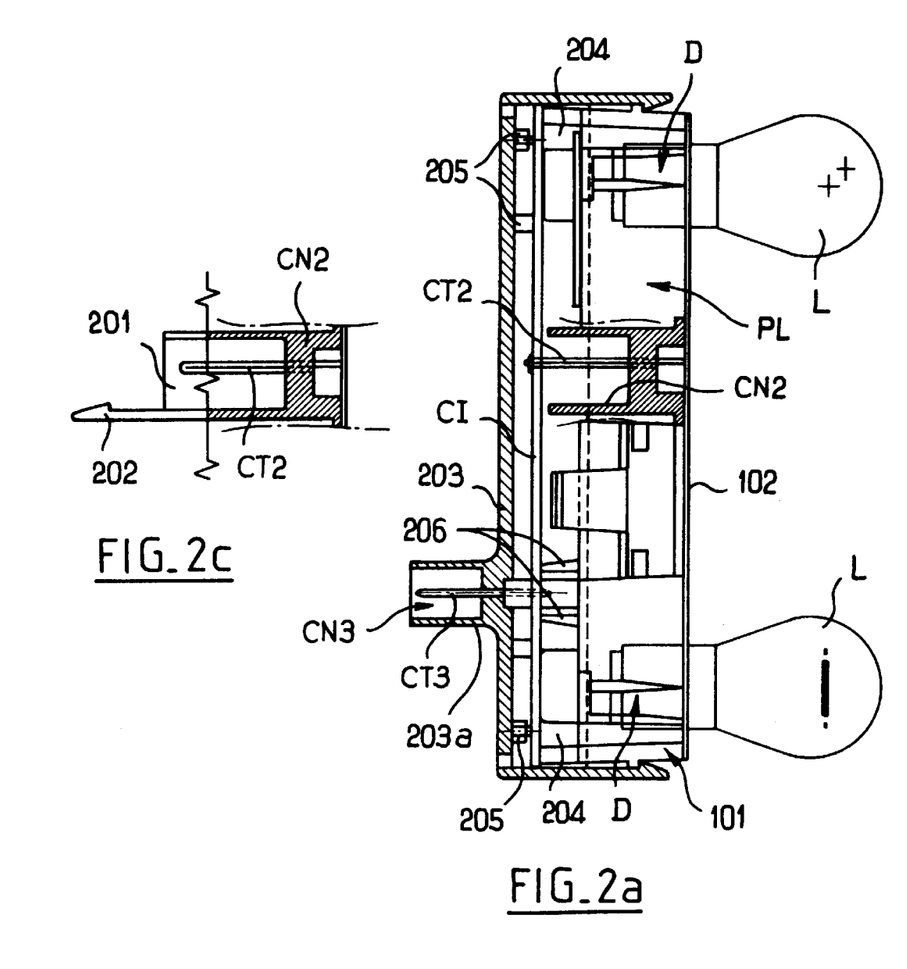
FIG. 2a is a side elevation view partially in section of a lamp-carrier module for signalling lights constituting a second embodiment of the present invention.
FIG. 2c is a side view in section showing a detail of the lamp-carrier-carrier module of FIGS. 2a and 2b.
Figure 2B:
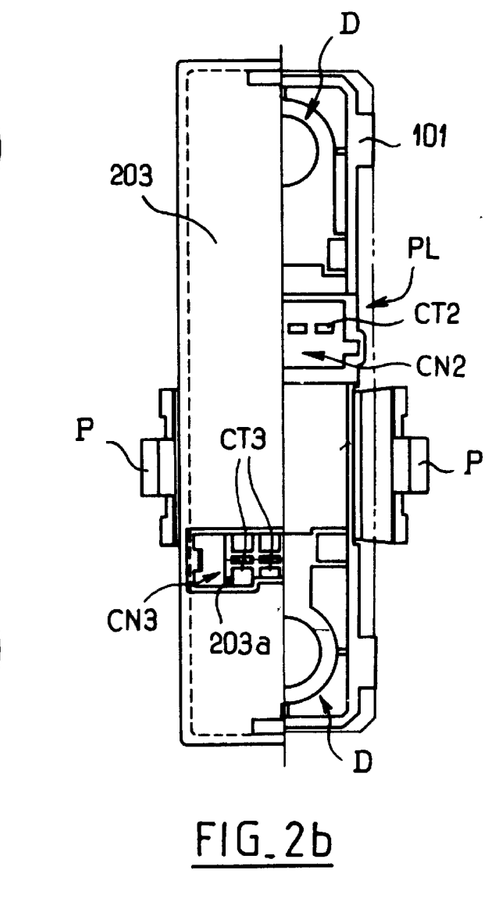
FIG. 2b is a rear elevation view of the FIG. 2a lamp-carrier module, with the left and right halves respectively showing two different implementations of the lamp-carrier-carrier module.

With reference now to FIGS. 2*a* to 2*c*, there can be seen a lamp-carrier that likewise comprises a conventional type of lamp-carrier PL having an insulating support 101 and cutout tracks 102.

This embodiment is particularly designed to enable the lamp-carrier module to be made in conventional manner, i.e. with individual power supplies to respective lamp-carriers by means of a bundle of conductors leading to the optical block, or else by means of multiplexed control.

To achieve this object, the central region of the lamp-carrier PL carries a preferably integrally formed connector CN2 which originally has the conventional shape shown in FIG. 2*c*, and in particular including a region 201 that projects rearwards beyond the free ends of the male contacts CT2 of said connector, and that carries a locking tongue 202 (non-shaded portion).

In its non-multiplexed version, the lamp-carrier module includes the connector CN2 as described above.

In its multiplexed version, the same connector CN2 is truncated in its rear region so as to retain only the portion that is shaded in FIG. 2*c*, thereby allowing its contacts CT2 to stand proud thereof. It can be seen in this case that the connector is easily made in both versions by using a removable insert in the mold which is used for molding the lamp-carrier PL.

A printed circuit CI carrying the components (not shown) of the demultiplexing circuit and of the power circuit is placed behind the lamp-carrier, parallel thereto, in the vicinity of the rear of the connector CN2 (i.e. to the left in FIG. 2*a*). The contacts CT2 pass through holes in the printed circuit and are soldered thereto.

The printed circuit CI carries another set of contacts CT3 that project rearwards.

A cover 203 covers the assembly constituted by the lamp-carrier PL and the printed circuit CI, and it includes a fitting 203*a* defining a rear cavity into which the contacts CT3 penetrate to form a connector CN3 for feeding the multiplexed control signals, the power supply voltage, and ground.

The cover 203 may be snap-fastened onto the flanks of the lamp-carrier PL. Fittings 204 and 205 are provided respectively towards the rear of the lamp-carrier and towards the front on the inside of the cover 203 to hold the printed circuit CI in place.

It will also be observed that the lamp-carrier PL includes, in register with the connector CN3, a support fitting 206 against which the printed circuit CI bears so as to withstand the forces that appear in an axial direction when a connector complementary to the connector CN3 is engaged therewith. This avoids any risk of the printed circuit being damaged by too much bending.

The lefthand side of FIG. 2*b* shows the appearance of the lamp-carrier module in its version for multiplexed control, while the righthand side shows the appearance of the same lamp-carrier module in its non-multiplexed version, i.e. without the printed circuit and without the cover 203.

Figure 3A:
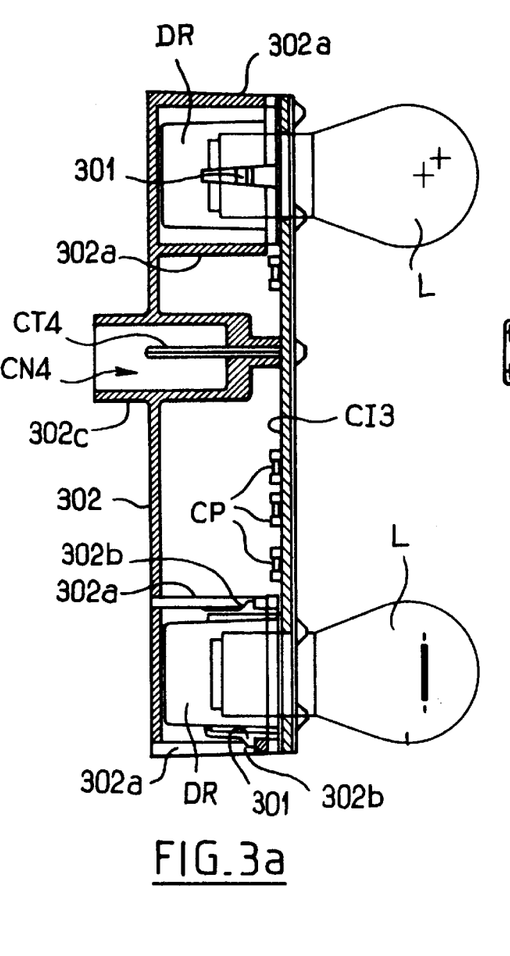
FIG. 3a is a side elevation view partially in section of a lamp-carrier module for signalling lights constituting a third embodiment of the present invention.

With reference now to FIGS. 3*a* to 3*c*, there can be seen a lamp-carrier module which is essentially characterized in that the lamp-carrier PL is constituted by a printed circuit CI3.

The printed circuit includes openings 301 designed to receive the bases CL of the lamp-carriers L. Sockets DR are applied to the rear of the circuit CI3 and are fixed thereto by soldering, so as to provide simultaneously both mechanical support and electrical connection.

It may be observed that each of these sockets includes snap-fastening tabs 301.

The rear side of the printed circuit CI3 (to the left in FIG. 3*a*) carries components of the demultiplexing circuit and of the power circuit. In this embodiment, the components are of the surface-mount type. In this case, a double-sided printed circuit is used, in which case the component side carries electrical connections between the various components for reflow soldering, whereas the side opposite from the components carries tracks connecting the connector CN4 to the circuits and the power tracks that connect the power circuit to the sockets DR.

The male contacts CT4 of the connector CN4 are soldered to the central region of the printed circuit CI3 and project rearwards.

The lamp-carrier module of this embodiment also includes a supporting and protective housing 302 that serves as a rear cover and that includes members 302*a* extending forwards from the region surrounding each of the sockets DR and carrying fittings such as openings 302*b* designed to co-operate with snap-fastening tabs 301 provided on the sockets. This ensures that the sockets are fixed inside the cover 302, after which the printed circuit is installed and soldered (it naturally being possible to perform such assembly operations in some other order). The cover 302 also has holes through which the contacts CT4 pass, and in this region, it has a fitting 302*c* that defines a cavity into which the contacts project so that together they define the connector CN4. It may be observed that the front face of said fitting 302*c* bears against the rear face of the printed circuit in the vicinity of the contacts CT4, thereby stiffening the resulting assembly.

FIG. 3*b* shows the lamp-carrier module without its cover 302. Reinforcing ribs (not referenced) can be seen in this figure.

Figure 4:
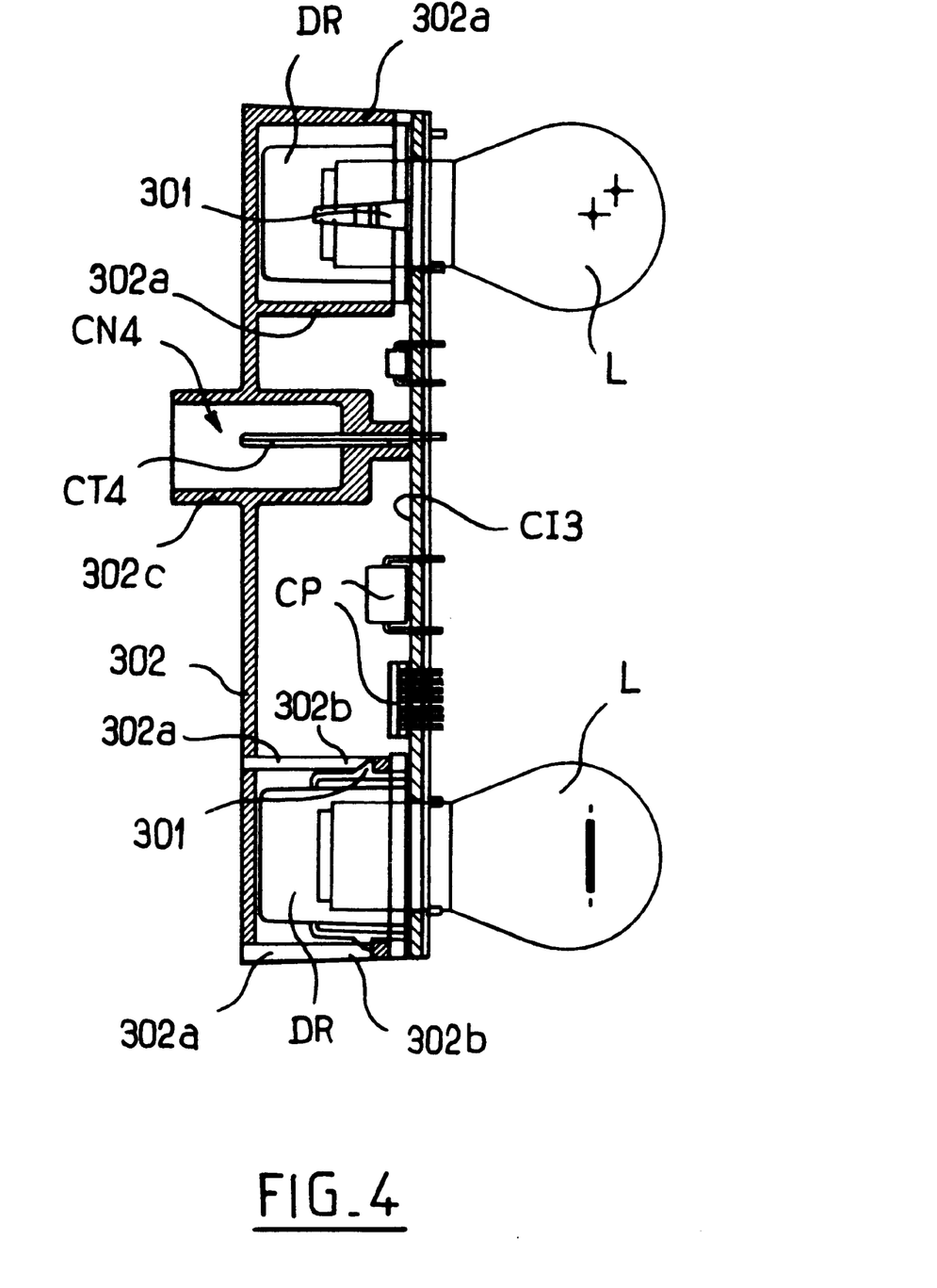
FIG. 4 is a side elevation view partially in section of a lamp-carrier module for signalling lights constituting a fourth embodiment of the present invention.

With reference now to FIG. 4, there can be seen a lamp-carrier module which differs from that of FIGS. 3*a* to 3*c* essentially in that the components CP that are used are through mount components, and the printed circuit is thus adapted accordingly. The other elements are identical and are given the same reference symbols. In this case, all of the connection portions of the components, of the sockets, and of the connector contacts that require soldering project from the same side of the circuit, i.e. the face of the printed circuit CI3 that faces away from the components, thereby enabling all of the connections to be made in a single wave soldering operation.

Reference is now made to FIGS. 5*a* to 5*d* which show a lamp-carrier module in which, as in the third and fourth embodiments, a printed circuit CI5, or indeed an insulated metal substrate (IMS) performs the same function as the circuit CI3. The components CP are surface-mount components (SMCs) as in FIGS. 3*a* to 3*c*. The substrate CI5 has no holes, particularly if it is desired to seal the inside space of the lamp-carrier module.

In this embodiment, all of the electrical connections are made in a single reflow operation that is conventional and that is performed on the rear side of the printed circuit, i.e. on its component side.

To this end, the connector CN5 for feeding the multiplexed control signals, the lamp-carrier power supply voltage, and ground includes a specially designed base, and similarly the add-on sockets DR' have a configuration that is adapted to such reflow soldering.

Figure 5A:
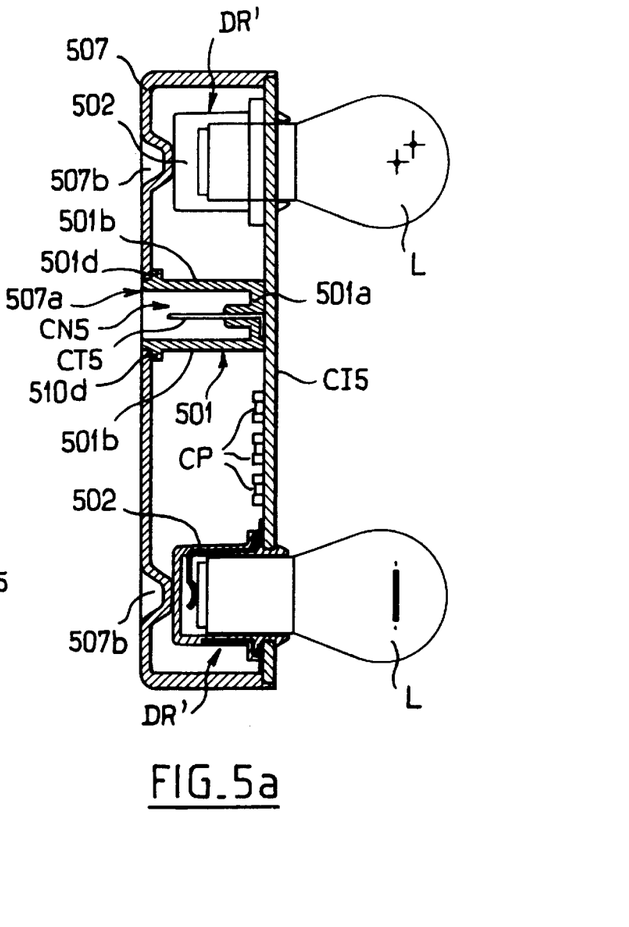
FIG. 5a is a side elevation view partially in section of a lamp-carrier module for signalling lights constituting a fifth embodiment of the present invention.
Figure 5B:
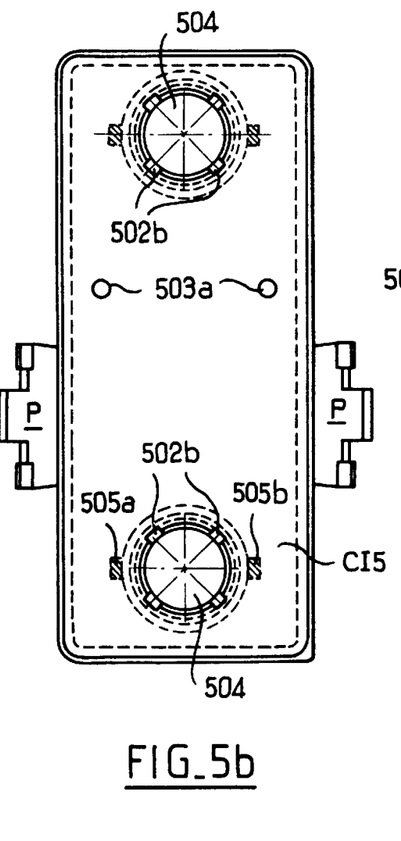
FIG. 5b is a rear view of the FIG. 5a lamp-carrier module with one of its components removed.
Figure 5C:
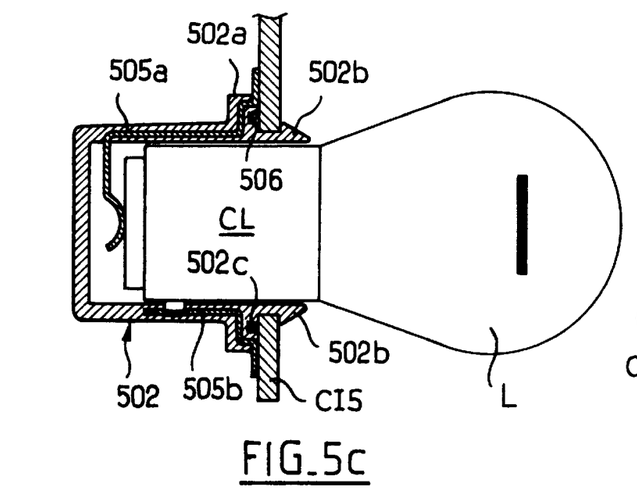
Figure 5D:
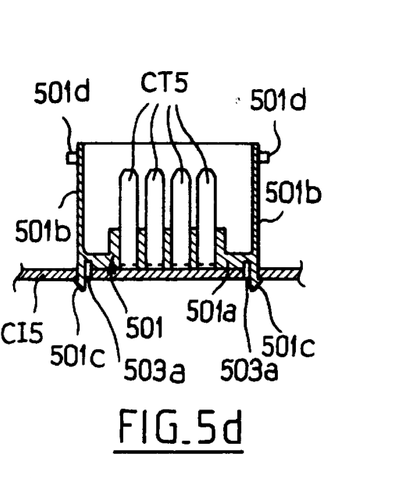
FIG. 5d is a plane view, partially in section, showing the lamp-carrier module of FIGS. 5a and 5b.

More precisely, as shown in FIGS. 5a and 5d, the connector CN5 has a special base 501 of insulating material. This base 501 includes an end wall 501a in which the associated contacts CT5 are secured and side walls 501b that define a cavity for receiving a complementary connector, with the contacts CT5 projecting into said cavity. On its face opposite from the cavity, the end wall includes grooves in which the ends of the contacts CT5, bent through 90°, are received. In this way, the base 501 fitted with the contacts CT5 has a base face designed to be pressed against the essentially plane printed circuit CI5 thus being made ready for a reflow soldering operation.

In addition, on either side of the end wall 501a, there are provided snap-fastening tongues 501c suitable for engaging in through holes 503a of the circuit CI5 in order to hold the connector in place until the reflow soldering operation has been performed.

At their ends opposite from the end wall 501a, the side walls 501b have a peripheral shoulder 501d for purposes explained below.

As can be seen in particular in FIG. 5c, each add-on socket DR' includes a body of insulating material 502 that is open at its printed circuit end and that is closed at its opposite end. The body is designed to receive the base CL of a lamp-carrier L.

The body 502 includes an outwardly directed flange 502a at its open end from which snap-fastening tongues 502b project for co-operating with notches formed in the printed circuit around holes 504 for receiving the lamp-carriers. The tongues 502b and the corresponding openings are preferably designed and positioned so as to ensure keying of the sockets while they are being positioned prior to reflow soldering, thus ensuring that the filaments of the lamp-carriers that the sockets are to receive will extend in the proper direction.

Conductor elements 505a and 505b are embedded in the body 502 (made by overmolding, for example), and each of them opens out at one end into the inside space of the body so as to establish an electrical connection in conventional manner with the metal base or with the terminal contact of a lamp-carrier, and at its other end opens each of them out into a region of the flange 502a. These other ends project radially from the flange, as shown, and lie flush against the generally plane surface whereby the body 502 presses against the printed circuit CI5 around the opening 504 when the above-specified snap-fastening is performed.

In this way, an add-on socket DR' is implemented that is likewise suitable for engaging in the reflow soldering operation.

It may also be observed that the body 502 of the socket includes an annular groove 502c in its base surface that receives an O-ring 506 for providing sealing between the outside and the inside of the body 502, i.e. between the inside of the subassembly that receives the electronic components, and the outside of the lamp-carrier module.

The lamp-carrier module in this embodiment also includes a cover 507 that covers the printed circuit CI5 and the components CT from behind. The cover 507 is preferably glued around its periphery to the edges of the printed circuit CI5.

The cover 507 includes an opening 507a for receiving the connector CN5. The peripheral shoulder 501a defines a bearing zone for the cover 507 around said opening. In this location, it is possible to ensure sealing either by providing adhesive or else by providing a gasket.

Furthermore, the cover 507 includes reinforcements 507b overlying the add-on sockets DR' to provide rear bearing surfaces for said sockets so as to prevent any risk of damage to the electrical and mechanical connection between the socket and the printed circuit, particularly while a lamp-carrier is being installed.

It may also be observed that in the embodiments described the lamp-carrier module may be mounted on a stand (not shown) for the block of lights by snap-fastening engagement of two facing resilient tabs P.

It may be observed that certain embodiments as described and shown are advantageously capable of using parts that are identical for the left block of lights and for the right block of lights in the same vehicle.

It will also be observed that those embodiments make it possible to establish all of the electrical connections by means of reflow soldering when surface-mounted components are used and/or by wave soldering, usually in a single operation. Manufacturing costs can thus be reduced and reliability increased.

The present invention is naturally not limited in any way to the embodiment described above and shown in the drawings, and the person skilled in the art will be able to apply any variants or modifications thereto that come within the spirit of the invention.

What is claimed is:

1. An electrical lamp-carrier module for a block of signaling lights for a motor vehicle, said module comprising;

a lamp-carrier implementing a plurality of recesses used as sockets for a plurality of lamp;

a first multi-pin connector having a plurality of pins respectively connected to each of the lamp sockets via an electrical circuit for selectively and individually powering said lamps, whereby said first multi-pin connector can receive a conventional complementary bundle connector for individually powering the lamps with individual power supply voltages selectively derived from the vehicle battery in a conventional manner;

wherein said module further comprises a separate multiplex-controlled lamp powering unit including;

a second connector for separately receiving a multiplexed lamp control signal containing instructions for turning on and off the respective lamp and a common power line which is permanently connected to said vehicle battery;

an electronic printed circuit board including said second connector and further including a plurality of electronic switching means each associated with one lamp of said plurality of lamps and responsive to said instructions in said control signal for selectively connecting said common power line to said one lamp; and means for connecting said electronic printed circuit to said first multi-pin connector;

whereby said lamps can be powered either by said conventional bundle connector or by said multiplex-controlled lamp powering unit receiving said control signal and said common power line.

2. A module according to claim 1, wherein the lamp-carrier is in the form of a plate including conductive tracks on one side constituting the electrical power link means, and a housing on the opposite side in which mounting means are provided for the printed circuit carrying said electronic circuit, and wherein said printed circuit carries contacts that extend parallel to an insertion and extraction direction for said printed circuit and suitable for passing through said lamp-carrier to be electrically connected to said tracks.

3. A module according to claim 2, wherein said insertion and extraction direction for the printed circuit is essentially perpendicular to a general plane of said lamp-carrier.

4. A module according to claim 2, further comprising a cover for closing said housing, an opening being formed in the cover to give access to a connector for electrical control and power supply purposes mounted on said printed circuit.

5. A module according to claim 1, wherein the lamp-carrier is in the form of a plate including on one side conductive tracks constituting said electrical circuit and on the opposite side means forming abutments for said printed circuit, wherein the printed circuit extends essentially parallel to a general plane of said lamp-carrier, wherein said first connector pins are provided between said conductive tracks and said printed circuit and extend essentially transversely to said printed circuit and to said lamp-carrier, and wherein a housing is also provided and mounted on the lamp-carrier said housing defining counter-abutments for the printed circuit.

6. A module according to claim 5, wherein said second connector includes contacts mounted on the printed circuit and passing through said housing, the housing defining a cavity for receiving said contacts.

7. A module according to claim 6, wherein the lamp-carrier includes means forming a bearing surface for said printed circuit in register with said second connector.

8. A module according to claim 1, wherein the printed circuit also constitutes a lamp-carrier support plate, wherein the electrical power link means are carried by said printed circuit, and wherein add-on sockets are also provided on the same side as the components of said electronic circuit and are soldered to the printed circuit.

9. A module according to claim 8, wherein a housing is also provided that includes fittings enabling it to be mounted on the module by co-operating with associated fittings formed on the add-on sockets.

10. A module according to claim 9, wherein said fittings are snap-fastening fittings.

11. A module according to claim 9, wherein a control and power supply connector is also provided including contacts mounted in the thickness of the housing and connected to the printed circuit, said housing including fittings that define a cavity for receiving said contacts.

12. A module according to claim 11, wherein said fittings bear against the printed circuit in the vicinity of the contacts.

13. A module according to claim 11, wherein the printed circuit is a double-sided printed circuit, wherein the components of the electronic circuit are surface-mount components, and wherein the sockets and the contacts of the connector are soldered to the printed circuit on its side opposite from the components.

14. A module according to claim 11, wherein the printed circuit is a single-sided printed circuit, wherein the components of the electronic circuit are through mount components, and wherein the portions of the components, of the sockets, and of the contacts of the connector that are to be soldered all project from the same side of the printed circuit, which side is opposite from the components, thereby making it possible to use a single wave soldering operation.

15. A module according to claim 8, wherein each socket includes a body of insulating material and at least two conductor members carried by the body, each conductor member projecting at one end into a cavity defined by said body for receiving the base of a lamp, and at its opposite end into the vicinity of a surface of the body that bears against the printed circuit and that is in alignment with said surface, thereby enabling electrical connections to be made with the socket by reflow soldering while simultaneously making connections with the components of the electronic circuit by reflow soldering.

16. A module according to claim 15, wherein said bearing surface of the socket body includes a groove for receiving a sealing ring.

17. A module according to claim 15, wherein said other ends of the conductor members project outwards relative to a base region of the body that defines said bearing surface.

18. A module according to claim 15, wherein each socket body includes fittings suitable for co-operating with associated fittings provided on the printed circuit for holding said socket body prior to reflow soldering.

19. A module according to claim 15, wherein a housing is also provided that is glued to the periphery of the printed circuit.

20. A module according to claim 18, wherein a control and power supply connector is also provided including a base holding captive a plurality of contacts of the connector, said base having a bearing surface pressing against the printed circuit and said contacts being disposed flush with said bearing surface to enable an electrical connection to be made with said base by reflow soldering simultaneously with the electrical connections with the components of the electronic circuit themselves being made by reflow soldering, said base defining a cavity in which the contacts of the connector are received.

21. A module according to claim 20, wherein the base of the connector includes fittings suitable for co-operating with associated fittings provided on the printed circuit for holding said base prior to reflow soldering.

22. A module according to claim 20, wherein said housing includes an opening in register with said cavity defined by the base.

23. A module according to claim 22, wherein the housing is soldered to said base in the vicinity of said opening.

24. A module according to claim 18, wherein the housing has, in register with each add-on socket, a fitting bearing against a face of said socket that is opposite from the printed circuit.

* * * * *